Sept. 8, 1942.    J. C. SHARP    2,295,298
HEATING SYSTEM
Filed April 25, 1939
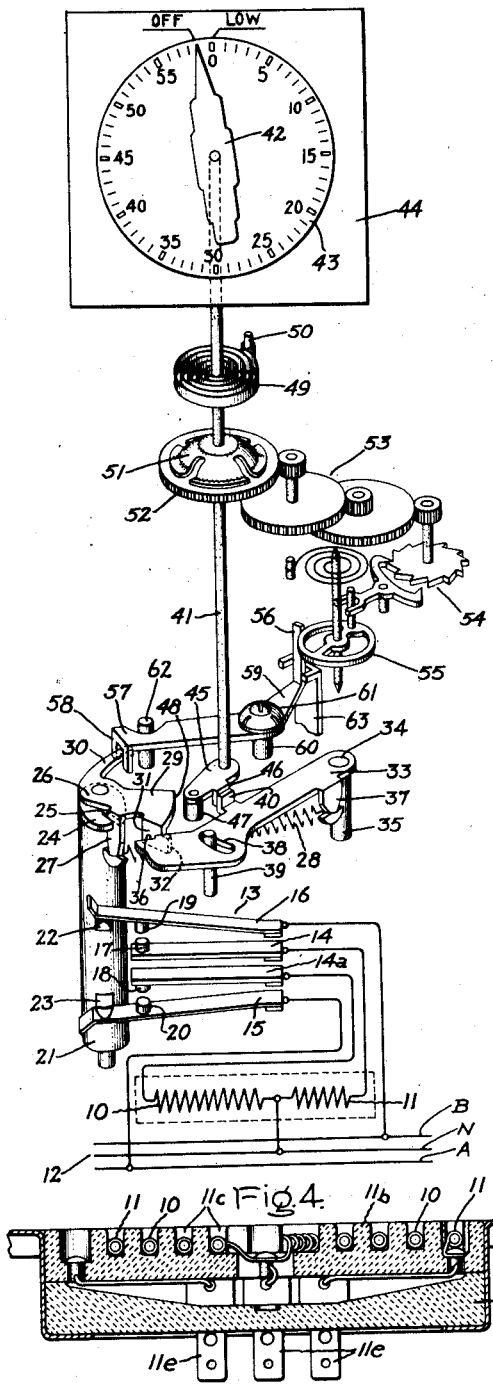
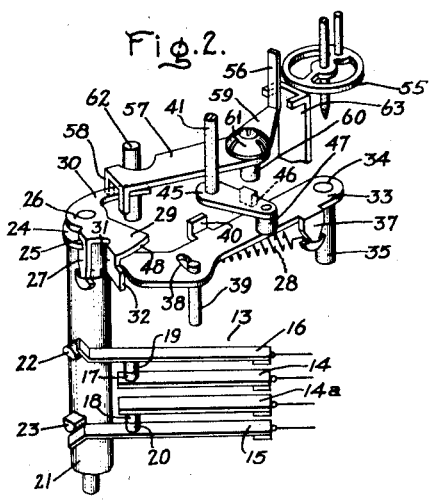
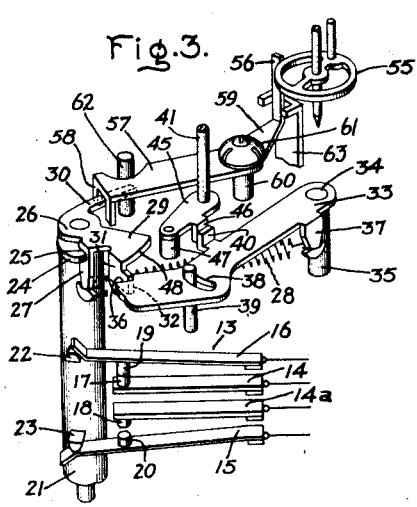
Inventor:
John C. Sharp,
by Harry E. Dunham
His Attorney.

Patented Sept. 8, 1942

2,295,298

UNITED STATES PATENT OFFICE 2,295,298

HEATING SYSTEM

John C. Sharp, Oak Park, Ill., assignor to Edison General Electric Appliance Company, Inc., Chicago, Ill., a corporation of New York Application April 25, 1939, Serial No. 269,897

7 Claims. (Cl. 219—20)

My invention relates to an electric heating system and more particularly to a heating system for a cooking unit for preparing cooked edibles and has for its object the provision of an improved arrangement of heating elements and control therefor for obtaining and maintaining various heat output conditions whereby a high heat output condition for starting the cooking of the edible is obtained and maintained for a predetermined interval and a low heat output condition for completing the cooking of the edible is automatically attained at the expiration of the predetermined interval.

It is a further object of my invention to provide simplified, easily operated and relatively inexpensive control means for obtaining various heat output conditions of a heating circuit, one of the heat output conditions being effective for a predetermined interval.

My invention is particularly applicable to the heating circuit of electric ranges and particularly to the heating circuit for the surface units or the well cooker of such ranges. It is to be understood, however, that my heating circuit and control therefor are of general application and may be employed with various types of heating devices in which it is desirable to obtain various heat output conditions.

In accordance with my invention in one form thereof, a heating circuit is provided having a plurality of heating elements arranged so that when all of the elements are energized the circuit is in its maximum heat output condition. Timing means are provided for deenergizing one of the plurality of heating units so as to provide a lower heat output condition for the circuit at the expiration of a predetermined interval. The control means for the circuit are constructed and arranged so that the initial movement thereof conditions the circuit for its high heat output operation and sets the timing device for the predetermined time desired. At the expiration of the predetermined time the circuit is automatically conditioned for its low heat output operation. The control means are then operable to terminate the low heat output operation of the circuit at any desired time. In addition, the control means are constructed so that setting of the timing device may be altered or one or all of the heating elements may be deenergized irrespective of the functioning of the timing device.

For a more complete understanding of my invention, reference should be had to the accompanying drawing in which Fig. 1 illustrates diagrammatically my improved heating circuit, the control therefor and the means (shown in perspective) by which the control is operated, the control and its operating means being shown in the position corresponding to the complete deenergization of the heating circuit; Fig. 2 is a fragmentary view of the control and its operating means illustrating the position of the control and its operating means when the heating circuit is completely energized and conditioned for its high heat output operation; Fig. 3 is a view similar to Fig. 2 but showing the position of the control and its operating means when the heating circuit is conditioned for its low heat output operation; and Fig. 4 is a vertical sectional view illustrating a surface unit of an electric range provided with my improved circuit.

Referring to Fig. 1, it will be observed that I have provided a heating circuit having a plurality of heating units including a high wattage unit 10 and a low wattage unit 11. In one application of my invention, the heating units 10 and 11 are adapted to be mounted in a surface unit of an electric range so as to apply heat to the edible placed upon the unit. In Fig. 4 I have shown the elements 10 and 11 located in a surface unit of the type shown and claimed in United States Letters Patent 1,522,206, granted January 6, 1925, to William A. Rankin. Briefly this surface unit comprises a metallic casing 11a in which are mounted a disk 11b and a disk 11c both of which are made of some suitable heat refractory insulating material. Provided in the disk 11b are grooves 11d for supporting the heating units 10 and 11. Connected to the ends of the heating units 10 and 11 and extending through the disk 11c are the leads 11e. While my invention is illustrated as applied to a surface unit and such a unit is described in detail, it is to be understood that my invention is not limited to such an application for it may be readily applied to the deep well cooker provided on an electric range or to various other heating devices.

As shown in Fig. 1, the units 10 and 11 are connected to a three-wire distribution system, indicated generally at 12, and having lines A, N and B, A and B constituting the outside conductors of the three-wire system and N constituting the neutral. The system 12 is in turn connected to some suitable source of power (not shown) so that the voltage between A and B will be approximately twice the voltage between A and N or B and N.

Arranged for controlling the operation of the high wattage and low wattage heating units is the control structure 13 which comprises a pair of fixed contact carrying arms 14 and 14a and a pair of movable contact carrying arms 15 and 16. Arranged on the fixed contact carrying arms 14 and 14a respectively are contacts 17 and 18 which cooperate respectively with contacts 19 and 20 provided on the movable contact carrying arms 15 and 16. As shown in Fig. 1, the movable contact carrying arms 15 and 16 are connected to the leads A and B respectively of the three-wire system and the fixed contact carrying arms 14 and 14a are connected to the low and high wattage units respectively, the common connection of the units being connected to the neutral line N of the three-wire system 12. In the position shown in Fig. 1, the movable contact arms 15 and 16 are in such a position that the pairs of contacts 17 and 19 and 18 and 20 are out of engagement and consequently the entire heating circuit is deenergized. When the movable arms 15 and 16 are moved to the position shown in Fig. 2, in a manner more fully described hereinafter, both the contacts 17 and 19 and the contacts 18 and 20 are brought into engagement and the heating circuit is then conditioned for high heat output operation, the high wattage and low wattage units 10 and 11 both being energized and being arranged across the low voltage lines AN and BN, respectively. When the movable arms 15 and 16 are moved to the position shown in Fig. 3, the contacts 18 and 20 are moved out of engagement and the circuit is conditioned for its low heat output operation, the high wattage unit 10 being deenergized and the low wattage unit 11 remaining energized.

In order to operate the movable contact arms 15 and 16 of the control 13 to obtain the various heat output operations indicated above, I have provided a cylindrical actuator 21 which is rotatably mounted in a suitable supporting frame (not shown). The actuator 21 is preferably of a phenol condensation product or some similar suitable material and has integrally formed thereon a pair of studs or bosses 22 and 23. The stud or boss 22 is arranged to be engaged by the movable arm 16 of the controlling device 13 and the stud 23 is arranged to be engaged by the movable arm 15 when the member 21 is rotated in the counterclockwise direction. It will be observed that the arm 15 is slightly longer than the arm 16 and it will therefore remain in engagement with its respective stud 23 for a longer interval of time than the member 16 will remain in engagement with its stud 22 when the direction of rotation of the member 21 is reversed. When the member 21 is rotated in a clockwise direction, as viewed in Fig. 1, it causes the movable arm 16 to drop off its respective stud 22 thereby closing the contacts 17 and 19 and, at a later interval, causes the movable arm 15 to drop off its associated stud 23 and close the contacts 18 and 20. It will thus be seen that rotation of the actuator 21 clockwise through a small distance causes the low wattage heating unit 11 to be energized and rotation of said member through a greater distance clockwise causes both the low wattage unit 11 and the high wattage unit 10 to be energized. Upon the rotation of the member 21 in a counterclockwise direction, the member 15 engages its stud 23 before the member 16 engages the stud 22 thereby causing the contacts 18 and 20 which control the high wattage 10 unit to be opened before the contacts 17 and 19 controlling the low wattage unit 11 are opened. It is therefore apparent that the relation between the control member 13 and the actuator 21 controls the sequence of operation of the high wattage and low wattage units so that either both the heating units or the low wattage unit alone may be energized.

To effect the operation of the actuator 21, I have provided a mechanical system constructed and arranged so that the actuator may be manually rotated in a clockwise direction to condition the heating circuit for high heat output operation, that is, rotated to actuate the control structure 13 so that both the high wattage and the low wattage units 10 and 11 may be energized. Incorporated in the mechanical system is timing means for causing rotation of the actuator 21 in the counterclockwise direction to deenergize the high wattage unit 10 at the expiration of a predetermined interval, the interval depending upon the extent of initial manual movement beyond that required to close the contacts controlling the high wattage unit. Upon the deenergization of the high wattage unit 10, the operation of the timing means ceases and the mechanical system is arranged so that the member 21 may be manually rotated in the counterclockwise direction to cause the low wattage unit 11 to be deenergized. The timing means incorporated in the system for driving the member 21 in a counterclockwise direction comprises a mechanical clock type timer in the particular embodiment of my invention illustrated. It is to be understood, however, that this invention is not limited to this particular type of timer for other types, for example, a thermal timer or an electrically driven clock timer, might be used for accomplishing the same result.

Included in the mechanical system referred to in the preceding paragraph is a flange 24 integrally formed at the top of member 21 and having a slot 25. Pivotally mounted on the flange 24 is a lever 26 provided with a depending arm or tang 27 which is adapted to be inserted in slot 25 provided in the flange 24 to form a driving connection between the pivoted lever 26 and the member 21. Attached to the lower end of the tang 27 is a spring 28 which biases the member 21 to such a position that the contacts of control member 13 are normally open as shown in Fig. 1. The lever 26 is substantially bell crank in form and is provided with arms 29 and 30. The arm 29 is provided with an integrally formed depending flange 31 which has an abutting portion 32 (Fig. 2) extending beyond the outermost edge of the arm 29.

Also included in the mechanical system is the lever 33 pivotally mounted at 34 to a post 35 fixed in a suitable supporting frame (not shown). The lever 33 is arranged to cooperate with the lever 26 and in particular the end of the lever 33 opposite its pivoted end is adapted to slide against the abutment 32. Provided in the side of the lever 33 which is adapted to engage the abutment 32 and adjacent the end thereof is a detent 36. Integrally formed on the lever 33 adjacent the pivoted end thereof is a depending tang 37 to which is attached the end of spring 28 that is opposite the end connected to the tang 27. In order to limit the pivotal movement of the lever 33 about its pivot point 34, a recess 38 is provided therein which is adapted to receive one end of a fixed post 39. Arranged on the side of the lever 33 which engages the abutment 32 and integrally formed therewith is the vertically extending abutment 40.

The lever 26 and the lever 33 constitute the driving and latching levers, respectively, in the mechanical system for operating the member 21. The remainder of the system comprises the means for manually and automatically operating this pair of levers and includes a shaft 41. Mounted on one end of the shaft 41 is a manually operated dial handle 42 which is arranged to cooperate with a dial 43 having suitable indicia arranged thereon the dial 43 being mounted in a casing 44. Provided on the opposite end of the shaft 41 is a crank arm 45 which is provided with an integrally formed depending abutment 46 (Fig. 2) which is adapted to engage the abutment 40 provided on the lever 33. Mounted in the end of the crank arm 45 is a roller 47 which is adapted to engage the cam surface 48 formed by the outer end of the arm 29 of lever 26. By means of the arrangement of elements described thus far, rotation of the dial indicator 42 in a clockwise direction causes a similar rotation of the crank arm 45 which causes the roller 47 to move into engagement with the cam surface 48 thereby causing a clockwise rotation of the lever 26 and a similar rotation of the actuator 21 through the driving connection between these last two members.

Mounted on the shaft 41 intermediate its ends is one end of a concentrically wound clock spring 49, the opposite end of which is fixed to a fixed post or stud 50. Also mounted on the shaft 41 adjacent the spring 49 is a friction disk 51 which is arranged to cooperate with a gear 52 loosely mounted on the shaft. Associated with the gear 52 are additional elements of the clockwork mechanism including a gear train indicated generally by the numeral 53, an escapement mechanism 54, and a balance wheel mechanism 55. Through the action of the friction disk 51, it is possible to drive the shaft 41 in a counterclockwise direction by means of the clockwork mechanism and it is also possible to rotate the shaft in a clockwise direction by means of the dial operator 42. It will also be observed that by means of the arrangement illustrated the moving of the dial operator 42 in a clockwise direction to set the device for a particular time simultaneously causes the spring 49 which drives the clock mechanism to be wound up. Thus in setting the device for any particular length of time the main spring of the clock mechanism will be wound so as to drive the clock for that particular interval of time.

In order to discontinue the operation of the clock mechanism upon the elapse of the predetermined interval of time selected, a brake 56 is provided to engage frictionally the balance wheel 55. The brake 56 is adapted to be actuated by means of a lever 57 which in turn is operated by the arm 30 of lever 26. The operative connection between the arm 30 and the lever 57 includes a depending U-shaped flange 58 provided at the end of the lever 57 and into which the end of the arm 30 is adapted to extend. The brake 56 is provided with an integrally formed arm 59 which together with the arm 57 is pivotally mounted on the fixed stud 60. A friction washer 61 is provided at the connection of the arm 59 and the arm 57 so that there may be some relative movement between these two arms. In order to limit the clockwise rotation of the arm 57, a fixed stop 62 is provided adjacent the depending U-shaped flange 58, and in order to limit the outward movement of the brake 56, a fixed U-shaped stop 63 is provided. As previously mentioned, clockwise rotation of the dial member 42 causes a similar rotation of the arm 45 and the lever 26. At the same time the arm 30 is moved in a clockwise direction and causes the lever 57 to move in a counterclockwise direction thereby moving the brake arm 56 in a counterclockwise direction away from the balance wheel 55 and permitting the clock mechanism to be started.

Referring now more in detail to the operation of my circuit and the control therefor, it will be assumed that the attendant desires to maintain a high heat output condition for a period of say 45 minutes to cook a particular edible after which it is desired to maintain a low heat output condition sufficient to maintain the temperature of the prepared edible. Under these assumed conditions, the dial member 42 will be rotated in a clockwise direction until the end thereof is opposite the numeral "45" on the dial face 43. This clockwise rotation causes a similar rotation of the shaft 41 and winds the main spring 49 of the clock mechanism, the friction disk 51 permitting the clockwise movement of shaft 41 relative to the gear train 53. The movement of the shaft 41 causes a clockwise movement of the arm 45 which in turn through the roller 47 and the cam surface 48 causes the lever 26 to move in a clockwise direction.

Fig. 2 shows the relative position of the operating members of the control when the dial operator has been moved to give a high heat period of 45 minutes. It will be observed that the arm 45 has been rotated approximately three-fourths of a turn from its initial position. In addition, the lever 26 is moved in a clockwise direction so that the end of lever 33 now lies behind the abutment 32 formed on the flange 31. Furthermore, the movement of arm 30 of lever 26 in a clockwise direction has through levers 57 and 59 caused the brake arm 56 to be moved out of engagement with the balance wheel 55.

It is to be observed that the initial clockwise movement of the lever 26 in response to the initial movement of the member 42 from its "off" position to its "low" position effects a sufficient movement of the member 21 to cause contact arm 16 to close contacts 17 and 19 to energize the low wattage element 11. The subsequent clockwise movement of the lever 26 in response to movement of the member 42 from the "low" position to the preselected timing position effects a sufficient movement of the member 21 to cause contact arm 15 to close contacts 18 and 20 to energize the high wattage element 10. With both the low wattage unit 11 and the high wattage element 10 energized the heating circuit is conditioned for its maximum heat output operation.

With the brake arm moved out of engagement with the balance wheel 55, the clock mechanism starts to operate and, by means of the main spring, escapement, and gear train arrangement, the shaft 41 is driven in a counterclockwise direction through friction disk 51. This causes a counterclockwise movement of the crank arm 45 which movement continues for the predetermined interval which, in the assumed instance, is 45 minutes. As the end of the selected time interval approaches, the clock mechanism has rotated the shaft 41 and the arm 45 in a counterclockwise direction so that the abutment 46 on the arm 45 engages the abutment 40 provided on the lever 33. Continued counterclockwise rotation of the arm 45 causes the lever 33 to be moved outward in a counterclockwise direction about its pivot point. At the end of the preselected interval, in this instance 45 minutes, the lever 33 has been moved outwardly in a counterclockwise direction unti the end thereof has moved from behind the abutment 32. With the restraint removed, the lever 26 moves in a counterclockwise direction under the force exerted by the spring 28 until the abutment 32 engages the detent 36 provided in the lever 33.

The relative position of the component elements under these conditions is clearly shown in Fig. 3. It will be observed that the limited counterclockwise rotation of the lever 26 has caused the member 21 to be rotated in a counterclockwise direction an amount sufficient to permit the movable arm 15 to come to rest upon its associated boss 23 and thereby open the pair of contacts 18 and 20. It will also be observed that the limited movement of the lever 26 transmitted through arm 30 and levers 57 and 59, has caused the brake lever 56 to move into engagement with the balance wheel 55 thereby stopping the operation of the clock mechanism. With the contacts 18 and 20 open, the high wattage unit 10 is deenergized and only the low wattage unit 11 remains energized thereby conditioning the circuit for low heat output operation.

By means of the latching relation between the abutment 32 and the detent 36 provided on the levers 26 and 33, respectively, the system is latched in the low heat output position and can only be unlatched by an additional movement of the arm 45 in the counterclockwise direction. When it is desired to return the circuit to its completely deenergized condition, it is only necessary to turn the dial member 42 in the counterclockwise direction from the position indicated as "low" to the position indicated as "off." This manual counterclockwise rotation of the dial indicator causes a similar movement of the arm 45 which in turn causes the lever 33 to be moved outward so that the abutment 32 no longer engages the detent 36. Then, by means of the force exerted by spring 28, the lever 26 is moved counterclockwise to the position indicated in Fig. 1, further movement of the lever in this direction being limited by the engagement of lever 57 with the stop 62. This movement of the lever 26 causes the operator 21 to be moved in a counterclockwise direction until the movable contact arm 16 comes to rest upon its associated boss 22 opening the pair of contacts 17 and 19 and deenergizing the low wattage unit 11.

As previously mentioned, the provision of the friction disk 51 permits the clockwise movement of shaft 41 independently of the gear train 53 in accordance with clockwise movement of the member 42. This friction disk also permits counterclockwise movement of the shaft 41 irrespective of the functioning of the timing device in response to counterclockwise movement of the member 42. Therefore if it is desired to adjust the setting of the timing device to, say, a shorter interval after the timing device has started to function, this may be done by turning the member 42 back a suitable amount in the counterclockwise direction which in turn causes a counterclockwise movement of shaft 41 and its associated arm 45, the friction disk 51 slipping relative to the gear 52 so that the adjustment is made irrespective of the functioning of the timing device. If, instead of adjusting the selected interval while the timing means are functioning, it is desired to deenergize either the high wattage unit 10 alone or both the high and low wattage units 10 and 11 before the expiration of the preselected time interval, this may be done by turning the member 42 in a counterclockwise direction to the "low" or "off" position as the case may be, the friction disk 51 operating in the manner just described to make possible this change irrespective of the functioning of the timing mechanism. In either case when the shaft 41 is manually turned in the counterclockwise direction the main spring 49 is unwound.

While I have shown a particular embodiment of my invention, it will be understood, of course, that I do not wish to be limited thereto since many modifications may be made among which is the substitution of another or different type of timer for the mechanical clock type timer described in detail above, and I, therefore, contemplate by the appended claims to cover any such modifications as fall within the true spirit and scope of my invention.

What I claim as new and desire to secure by Letters Patent of the United States is:

1. In an electrical cooking hot plate provided with a pair of heating elements for heating an edible placed upon said plate, switch means controlling the energization of said heating elements, a control member for said switch means manually operable from an "off" position to a controlling position to operate said switch means to energize both of said heating elements so as to obtain a high heat output of said hot plate, timing means operatively connected to said switch means to operate said switch means after a predetermined interval of time to control the energization of said heating elements to provide a low heat output of said hot plate, said switch means controlling to hold said low heat output of said hot plate until said control member is manually returned to said "off" position, whereupon said switch means is operated to shut off the heat of said hot plate.

2. In an electrical hot plate provided with a pair of heating elements, control means for controlling the energization of said heating elements, manual means for moving said control means in one direction to effect the energization of both of said heating elements so as to obtain a high heat output for said hot plate, timing means for moving said control means in the opposite direction so that after a predetermined interval of time one of said heating elements is completely deenergized independently of the other so as to obtain a low heat output for said hot plate, and means responsive to the extent of the initial movement of said manual means beyond that required to cause energization of both of said heating elements for preselecting said interval during which both of said heating elements are energized before said one heating element is completely deenergized.

3. In an electrical hot plate, an electrical heating unit provided with a high wattage heating element and a low wattage heating element, control means for controlling the energization of said heating elements, manual means operable to move said control means to a circuit controlling position to energize both of said heating elements to produce a high heat output operation of said hot plate, automatic timing means for moving said control means to a circuit controlling position after the elapse of a predetermined interval of time to deenergize completely said high wattage heating element independently of said low wattage heating element so as to produce a low heat output operation of said hot plate, and means responsive to the extent of initial movement of said manual means beyond that required to produce said high heat output operation for predetermining the length of the interval during which said high wattage unit is energized, said last mentioned means being operable by said manual means irrespective of the functioning of said timing means.

4. In a hot plate provided with two heating elements for applying heat to an edible placed upon the plate, switch means for controlling the energization of said heating elements, means for actuating said switch means and constructed and arranged to be moved manually in one direction to position said switch means so that both of said heating elements are energized to provide a high heat output operation of said hot plate to start the cooking of said edible, timing means connected to said actuating means to move said actuating means in an opposite direction after a predetermined interval of time to cause said switch means to be moved to deenergize one of said heating elements without affecting the energization of said other element to produce a low heat output operation of said hot plate, and manual means for moving said actuating means an additional amount in said opposite direction to cause said switch means to operate to deenergize said other of said heating elements to terminate said period of low heat output operation and to produce an "off" condition for said hot plate.

5. A control device for an electric hot plate having a pair of heating elements comprising a plurality of fixed contacts, a plurality of movable arms carrying contacts adapted to cooperate with said fixed contacts to control the energization of said heating elements, an actuator, means on said actuator for engaging said arms to cause said contact means to be moved from the circuit closing to the circuit opening position, means by which one of said movable arms is operated by said actuator at an interval different from said other movable arm, manual means for moving said actuator in one direction to move said arms so that both of said heating elements will be energized to produce a high heat output of said hot plate, automatic timing means for causing limited movement of said actuator in a direction opposite to said first mentioned movement to cause said one of said movable arms to be moved so as to deenergize completely one of said heating elements without affecting the energization of the remaining heating element so as to produce a low heat output of said hot plate, and means actuated by said manual means and operable after the operation of said timing means for manually moving said actuator in said opposite direction and additional amount to cause said other movable arm to be moved to deenergize said remaining heating element.

6. A control device for controlling the operation of a cooking hot plate having a pair of heating elements, said control device comprising a plurality of fixed contacts, a plurality of movable contacts arranged to cooperate with said fixed contacts to control the energization of said heating elements, a pair of movable contact arms supporting said movable contacts, one of said movable arms being longer than the other of said movable arms, an actuator, abutments on said actuator for engaging said movable arms to cause movement thereof, manual means associated with said actuator to move it in one direction to cause said movable arms to be moved to their circuit closing position to energize both said heating elements to produce a high heat output operation of said hot plate, time control means associated with said actuator to move it in a direction opposite to said first mentioned direction an amount sufficient to cause said long movable arm to be moved to effect the complete deenergization of one of said elements without affecting the energization of the other thereby producing a low heat output operation for said hot plate, and means associated with said actuator for causing it to be moved manually in said opposite direction to cause said other movable arm to be moved to effect the deenergization of said other element, said last mentioned means being operable at any time after the operation of said timing means to provide an "off" condition for said hot plate.

7. In an electrical hot plate, a heating unit therefor, switch means controlling the energization of said heating unit, a control member for said switch means constructed and arranged so that when it is manually operated from an "off" position in one direction through a predetermined degree of movement to a predetermined position it operates said switch means to energize said heating unit to provide a high heat output condition for said hot plate, a timing mechanism connected to said control member constructed and arranged so as to be set by the movement of said control member from said "off" position to operate to measure a time interval, the length of said time interval depending upon the extent of movement of said control member to said predetermined position, the timing mechanism when set functioning to move said control member in the opposite direction until it arrives at said predetermined position whereupon the control member functions to control the operation of said switch means to cause said heating unit to provide a lower heat output condition therefor, the switch means controlling said heating unit to hold said low heat condition until said control member is manually returned to said "off" position.

JOHN C. SHARP.